March 26, 1946.　　F. D. BURNS　　2,397,127
REGULATOR STABILIZER
Filed Oct. 1, 1942
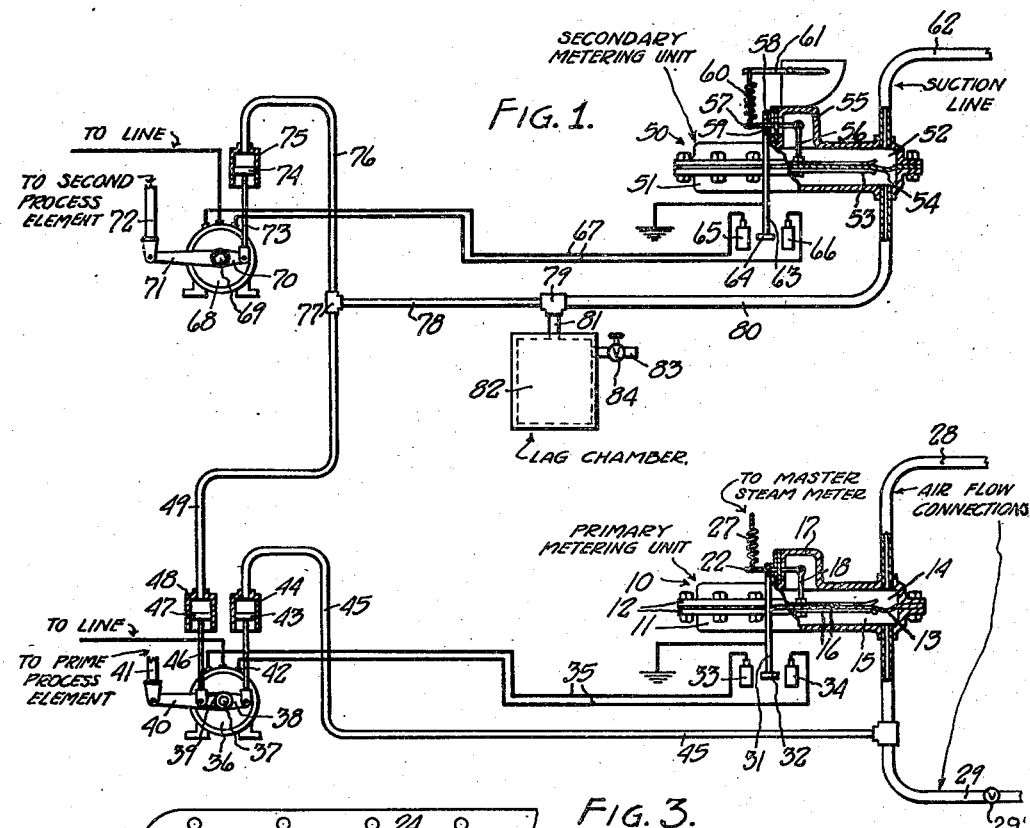
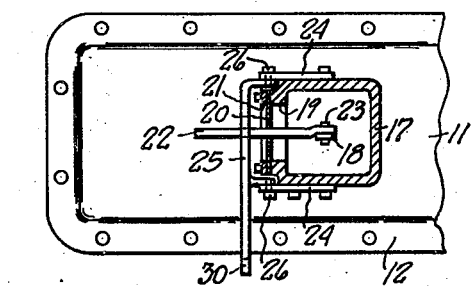
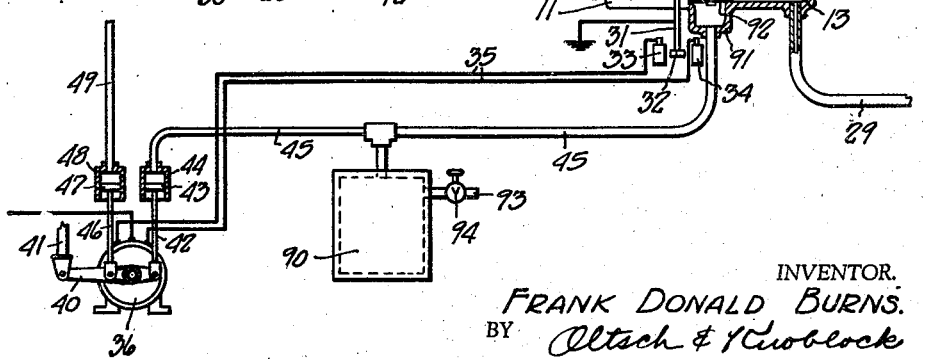
INVENTOR.
FRANK DONALD BURNS.
BY Oltsch & Knoblock
Attorneys.

Patented Mar. 26, 1946

2,397,127

UNITED STATES PATENT OFFICE 2,397,127

REGULATOR STABILIZER

Frank Donald Burns, Long Beach, Ind., assignor to The Hays Corporation, Michigan City, Ind., a corporation of Indiana Application October 1, 1942, Serial No. 460,390

16 Claims. (Cl. 236—14)

This invention relates to a stabilizer for controllers or regulators, and more particularly to the provision of a stabilizer for the controllers or regulators for a controlled process, such as a combustion system, wherein the maintenance of a desired condition in the controlled process depends upon two or more elements having a sequential effect upon the process.

Where two or more factors or elements cooperate to control a condition in a process, and especially where these elements are spaced apart or act upon the process at different stages thereof, and are actuated individually under the control of individual metering devices which measure conditions at different stages or points of the controlled process, a lag factor may result which unbalances the controllers. This is particularly true where a change in the setting of a primary control element is in a direction or of a nature opposing the setting of a secondary control element associated therewith. In such a case, the effect upon the controlled process or the controlled condition of the process, during the time interval or lag occurring before the secondary control element is reset to cooperate with the new setting of the primary control element, may be detrimental to the desired efficient operation of the process, or may change the controlled condition of the process in a manner opposite or contrary to that which the change in the process requires, or which a cooperative operation of both control elements will effect.

An example of a process which presents this condition is a combustion system provided with a forced draft fan, whose outlet is controlled by steam pressure, for supplying air to the combustion system, and with an induced draft fan adjacent the stack of the combustion system whose operation supplements the first fan and which has inertia or capacity lag. It will be apparent that a change in the system, such as a steam pressure drop, requiring an increased air flow in the system may result in such an increase of the flow of air from the forced draft fan, that a positive pressure may build up in the combustion chamber of the system if any substantial lag occurs in the operation of the induced draft fan.

It is the primary object of this invention to provide a stabilizer having means responsive to the metering device associated with a primary process control element for actuating a pre-actor element adapted to act upon the metering device associated with a secondary process control element in advance of the normal actuation of said last named metering element by changes occurring within the controlled process.

A further object is to provide a stabilizer for a process having multiple control elements acting upon the process at successive stages thereof, with means responsive to a master or primary process control element for applying a measured pre-acting impulse to a secondary process control element having a lag relative to said master or preceding process control element.

A further object is to provide a stabilizer for a process having multiple successively operating control elements with means for balancing the controls of the process in the shortest time possible.

A further object is to provide means for reducing to a minimum the time required to effect control of a process having successively operating control elements.

A further object is to provide a process having successively operating control elements responsive to pneumatic metering devices, with a stabilizer including a pneumatic system connected with a secondary metering device for transmitting thereto fluid pressure generated in response to operation of a primary metering device.

Other objects will be apparent from the description and appended claims.

In the drawing:

Fig. 1 is a schematic or diagrammatic view illustrating the application of the invention to a process having predominant metering lag at the primary control element.

Fig. 2 is a schematic or diagrammatic view of the primary portion only of the stabilizer, illustrating the application thereof to a process having predominant storage lag at the primary control element.

Fig. 3 is a fragmentary sectional detail view taken on line 3—3 of Fig. 2.

The drawing illustrates the arrangement and connection of my stabilizer best adapted for use with a furnace or boiler (not shown) of the type employing a turbine driven forced draft fan (not shown) at the air intake to the combustion chamber and controlled to respond to variations in steam pressure, and employing a turbine driven induced draft fan (not shown) at the air outlet or stack of the combustion system. The construction and operation of the device will be explained with reference to such a furnace or boiler, but it will be understood that all references to such application are illustrative only of one use to which the invention may be applied, and are not intended to be limiting. Thus the invention is applicable to many other uses or processes wherein multiple control elements act in the device in different stages or in sequence, which it is unnecessary to recite or enumerate specifically or individually because the application of the invention thereto is the same as in the instant described application.

As used herein, the terms "metering lag" and "storage lag" will be understood to have the following definitions: "Metering lag" is the time lag in the control system occurring between the metering unit of the control system and the point at which the fluid connection for said metering unit is tapped with the process to be controlled, and also includes lag induced by inertia of mechanical parts directly controlled or operated by the metering unit. "Storage lag" is the time lag in the process to be controlled occurring between the control element therefor, such as a damper in a stack, and the point of the process at which the fluid connection to the metering unit is tapped.

Referring to Fig. 1, which illustrates the application of the invention to a process wherein metering lag predominates at the connection of the primary metering unit with the primary process control element, the numeral 10 designates the primary metering unit. Metering unit 10 comprises a two-part housing 11 having a substantially central parting plane. Housing 11 has marginal flanges 12 between which are clamped the margins of a suitable diaphragm 13. Diaphragm 13 divides the interior of housing 11 into two chambers 14 and 15. A pair of rigid metal plates 16, smaller than the interior dimension of housing 11, are secured to opposite sides of the central portion of diaphragm 13. Housing 11 has a central outwardly off-set chambered portion 17 projecting from one side thereof, and a rod 18 rigidly secured to plates 16 and diaphragm 13 at the center thereof projects perpendicularly therefrom into chambered housing portion 17. An opening 19 is formed in one wall of portion 17, and a diaphragm 20 spans said opening and is marginally clamped thereagainst by a clamp ring 21. A lever 22 is pivoted at 23 to the upper end of rod 18 and extends substantially perpendicularly therefrom and through the center of diaphragm 20 which has a tight fit therearound. A pair of opposed arms 24 are secured at opposite sides of and project from housing portion 17, and the opposite arms of a yoke 25 spanning the diaphragm 20 and clamping ring 21 are pivoted to said arms 24 at 26 in axial alignment with diaphragm 20. Lever 22 passes through yoke 25 and pivots said yoke upon pivoting thereof.

The outer end of lever 22 is connected by a tension spring 27 with an operating element in the process being controlled, for example, with a master steam meter. Conduits 28 and 29 constitute air flow connections with the system being controlled, for example, differential pressure connections to the air supply line to a preheater (not shown) taken at the inlet and outlet of the air side of said preheater. Conduits 28 and 29 open in communication with housing chambers 14 and 15 on opposite sides of diaphragm 13. Spring 27 and conduits 28 and 29 apply to metering unit 10 the control impulses therefor.

Yoke 25 includes a lateral projection 30 from which a weighbeam 31 fixedly depends. Weighbeam 31 mounts a magnet 32 at its lower end. A pair of mercury switches 33 and 34 is juxtaposed to magnet 32, one on each side of said magnet and in the plane of movement of said weighbeam 31. Switches 33 and 34 are equally spaced from magnet 32 when the weighbeam is in neutral position. Each of these switches is connected by suitable electric connecting lines 35 with a power member 36, here illustrated as a reversible electric motor. It will be understood, of course, that any other suitable type of power member which may be found desirable may be employed. Power member 36 operates shaft 37, which carries a pair of similar diametrically opposed arms 38 and 39, and an arm 40. Arm 40 is connected by a member 41 adapted to control some element of the controlled process, for example, a forced draft fan damper, a speed control valve, a rheostat, or a hydraulic coupling, by means of which the speed of the fan and the supply of air to the furnace combustion chamber may be regulated.

Arm 38 is pivotally connected to a connecting rod 42 mounting a piston 43 shiftable in a stationary cylinder 44 open at one end. The opposite end of cylinder 44 is connected by a conduit 45 which is connected in communication with high pressure conduit 29. Arm 39 is pivotally connected to a connecting rod 46 mounting a piston 47 shiftable in a stationary cylinder 48 open at one end. The opposite end of cylinder 48 is connected with a conduit 49. Cylinders 44 and 48 may or may not be identical and are arranged in complementary relation to power member 36, whereby operation of arms 38 and 39 produces opposite reactions within said cylinders, i. e., a positive pneumatic pressure within one cylinder and its connections and a negative pneumatic pressure within the other cylinder and its connections.

A secondary metering unit 50 of substantially the same type as metering unit 10, is also provided in the device. Metering unit 50 comprises a two-part housing 51 divided into opposed chambers 52 and 53 by a diaphragm 54 clamped between the housing parts. One part of housing 51 has a central chambered projection 55 into which the free end of a rod 56 secured centrally to diaphragm 54, and in perpendicular relation thereto, projects. A lever 57 is pivoted to the end of rod 56 and passes through a diaphragm 58 closing an opening in one side of housing projection 55. A yoke 59 is pivoted to housing projection 55, and lever 57 extends therethrough. The outer end of lever 57 is connected by a tension or loading spring 60 with a suitable adjusting or control element 61. A conduit 62 is connected with the metering unit in communication with housing chamber 52, and with the process under control, for example, with the furnace draft of the combustion unit.

Yoke 59 mounts a depending weighbeam 63 which carries a magnet 64 at its lower end. A pair of mercury switches 65 and 66 are arranged in opposed spaced relation to the neutral position of weighbeam 63, and in the plane of movement of said weighbeam. Switches 65 and 66 are connected by suitable electric lines 67 with a secondary power member 68, such as a reversible electric motor. Power member 68 operates shaft 69 mounting a short arm 70 and an arm 71. Arm 71 is connected by member 72 pivoted thereto with an element of the process being controlled, for example, with a control valve, a rheostat, or a hydraulic coupling lever for controlling the speed of an induced draft fan in the furnace outlet.

Arm 70 has pivotally connected thereto a connecting rod 73 mounting a piston 74 within a stationary cylinder 75 open at one end. A conduit 76 is connected to the opposite end of cylinder 75. Conduit 76 is connected in communication with conduit 49 by means of a T fitting 77, and a conduit 78 branches from said fitting. Conduit 78 is connected by a T fitting 79 with a conduit 80 which is connected with metering unit 50 in communication with chamber 53 thereof. Conduit 81 branches from T fitting 79 for communication with a lag chamber 82. A conduit 83 communicates with lag member 82, is open at its outer end, and has a valve 84 interposed therein.

The operation of the device is as follows: When an increased air flow to and through the combustion chamber is required, as upon a steam pressure drop in the boiler, the tension of spring 27 is increased and shifts the weighbeam 31 in an increase direction to position its magnet 32 in operative relation to increase switch 33. This closes an electrical circuit to the power member 36 for operation thereof in increase direction, for example, counterclockwise direction as viewed in Fig. 1. This operation of the power member 36 swings arms 38, 39 and 40. Arm 40 serves to shift member 41 to adjust the setting of the proc- ses controlling element, i. e. damper, valve, rheostat, liquid coupling or the like, with which it is connected to provide an increased air flow to the combustion system. Arm 38 serves to force the piston 43 toward the closed end of cylinder 44 to create a positive air pressure therein and to apply said pressure through conduit 45 to conduit 29 and chamber 15 of the metering unit 10. This air pressure increase in chamber 15 complements the pressure in line 29 and reestablishes a balanced relation of diaphragm 13 as against the setting of the spring 27 which initiated the operation. This rebalance operation returns the weighbeam to neutral and stops operation of power member 36. A valve or orifice 29' (not shown) may be provided in the conduit 29 between the conduit 45 and the process, and may be set or adjusted as desired to regulate the time required to dissipate the pressure applied thereto through conduit 45 from cylinder 44. When the cylinder-generated pressure increase has dissipated, the pressures in the diaphragm chambers return to the true pressures in the process being controlled. The time interval required for this dissipation is adjusted to compensate for the time required to attain the desired increased air flow corresponding to the new setting of member 41. Hence the dissipation of cylinder-generated pressure in chamber 15 is complemented by the increase in pressure in conduit 29 incident to the increasing differential between conduits 29 and 28. Either "dead beat" regulation to prevent over-running of the regulated element, or "hunting" regulation with greater speed of response and with progressive reductions in amplitude of the successive process deviations, may be provided according to the rate at which the diaphragm is rebalanced.

In the event that a decrease in the air flow to and through the combustion chamber is required, as upon an increase in the steam pressure in the boiler above a given setting, the tension of spring 27 is decreased, unbalancing diaphragm 13 and swinging the weighbeam 31 in decrease direction to position magnet 32 in operative relation to decrease switch 34. This closes an electrical circuit to power member 36 for operation in decrease or clockwise direction as viewed in Fig. 1. The resulting movement of arms 38 and 40 serves to shift member 41 to provide a decreased air flow, and to shift piston 43 toward the open end of cylinder 44 to reduce the pressure in said cylinder and in conduit 45. The pressure decrease is applied to chamber 15 to rebalance diaphragm 13 and weighbeam 31 and stop power member 36, and the time it remains effective, i. e., until its effect is dissipated, is controlled as aforementioned. Thus the device operates to stabilize operation of the metering unit 10 and the process control element associated therewith, to prevent excessive hunting, in the same manner as the stabilizer forming the subject matter of the Burns and Thorne patent application Ser. No. 335,542, filed May 16, 1940, now Patent No. 2,320,508, granted June 1, 1943.

In the instant device, upon each operation of the power member 36 creating a pneumatic pressure in cylinder 44 applied to the metering unit 10 to stabilize the same as aforesaid, an opposite pneumatic pressure is created in cylinder 48. Thus, assuming operation of metering unit 10 in increase direction creating a positive pressure in cylinder 44, a sub-atmospheric pressure will be created simultaneously in cylinder 48 by virtue of movement of piston 47 toward the open end of said cylinder by connecting rod 46 and arm 39. This sub-atmospheric pressure will create a sub-atmospheric effect within the conduit 49 and its communicating elements, particularly conduits 78 and 80, lag chamber 82 and chamber 51 of metering unit 50. Reduction in pressure in chamber 51 will destroy the normal balanced relation of the draft connection 62 and the loading spring 61 upon diaphragm 54, thus swinging the weighbeam 63 to position its magnet 64 in operative relation to switch 65 to close a circuit to secondary power member 68. Operation of power member 68 serves to swing arms 70 and 71. Arm 71 shifts member 72 to regulate the secondary control element, i. e., induced draft fan speed control, rheostat, or hydraulic coupling lever, etc., to increase induced draft fan speed adjustment. At the same time arm 70 shifts piston 74 in cylinder 75 to create a positive pressure therein which is applied through conduits 76, 78 and 80 to chamber 51 of the metering unit to supplement the suction effect of draft connection 62 and thereby rebalance the diaphragm 54, return weighbeam 63 to neutral position, and stop secondary power member 68. The lag chamber 82, being open to atmosphere through conduit 83, serves to dissipate the successive stabilizing pressures generated by cylinders 48 and 75, respectively, in a time interval governed by the setting of its bleed valve 84 and proportional to the time required for the induced draft fan to attain operation corresponding to the new setting of member 72 which regulates the same.

A reverse operation of the secondary units occurs when the primary metering unit 10 operates in decrease direction. Specifically, operation of power member 36 responsive to metering unit 10 shifts piston 47 toward the closed end of cylinder 48 to create a positive pressure in said cylinder which is transmitted to chamber 51 of secondary metering unit 50. This pressure supplements the existing effect of draft connection 62 upon the diaphragm 54 to overcome the tension of spring 57 and swing weighbeam 63 and its magnet 64 into operative relation to switch 66 and thus close an operating circuit to secondary power member 68. Power member 68 then operates member 72 in reduced direction, and shifts piston 74 toward the open end of cylinder 75 to create a sub-atmospheric pressure therein which acts upon chamber 51 in opposition to draft connection 62 to rebalance the diaphragm and stop power member 68. The bleed valve 84 regulates the time during which the respective cylinder generated pressures aforesaid are effective upon the secondary metering unit 50.

It will be noted that the operation of the primary power unit 36 performs three distinct functions in this device, i. e., operation of the primary process controlling element, operation of means for stabilizing the primary metering unit, and operation of means for inducing a pre-acting operation of the secondary metering unit complementary to the operation of the primary process controlling element. The last named operating means, i. e., cylinder 48 and associated parts, thus constitute a "pre-actor" which may be said to prepare and condition the secondary metering unit and its associated control element for the change in the process being controlled which the primary metering unit and power member have initiated. Thus, if the change is an increased air flow from the forced draft fan, the cylinder 48 initiates the operation of secondary metering unit 50 necessary to effect a corresponding increase at the induced draft fan, before the increase in air flow from the forced draft fan reaches the stage of the process being controlled at which the induced draft fan is located. It is important to note, also, that the preacting impulse to the secondary metering unit is a measured impulse, so that the necessary balance or relation between the two control elements, such as the forced draft and induced draft fan, continues in all adjustments or regulations of the controlled process.

The importance of the preaction in the process selected for illustration is readily apparent. Thus, if the preaction connection between primary and secondary metering units was not provided, and the secondary metering unit operated solely in response to air flow or draft conditions in the process adjacent the secondary control element, a sharp increase in air flow at the primary control element or process air intake generated by the forced draft fan would impose a load upon the secondary control element, i. e., induced draft fan, which the latter was incapable of meeting immediately, with the result that a positive pressure would be built up in the combustion chamber incident to the time lag before the secondary control element would become operative to compensate for the increase in response to the delayed operation of the secondary metering unit. Also, such a condition might entail over adjustment and excessive hunting of the secondary unit before balanced relation of the secondary control element to the primary control element could be established. Consequently, the instant device reduces the time necessary to control a process, and quickly puts the system in balance.

While the invention has been illustrated as applied to a process having two control elements at successive stages of a controlled process, its application is not limited thereto. Thus, if three or more control elements are included in the process at successive stages thereof, the preacting means may be enlarged or increased to accommodate all of the subsequent or succeeding elements. The pre-actors may be arranged in various ways or operating sequencies. Thus, all preactors can be arranged for simultaneous actuation directly from the operation of the primary power member, or they can be arranged for sequential actuation, i. e., with the pre-actor for the secondary control element actuated by the primary power member, and the pre-actor for the tertiary control element actuated by the secondary power member, etc.

While the Fig. 1 embodiment illustrates the application of the invention to a process having a predominant metering lag at the primary control element, the invention is equally effective and applicable to a process having a predominant storage lag at the primary control element. Such an application is illustrated in Fig. 2 and entails the connection of a lag chamber 90 with the conduit 45, and the connection of said conduit 45 with a chamber 91 of the metering unit separated from chamber 15 by a diaphragm 92 which is connected with diaphragm 13 by rod 18. Lag chamber 90 has an open ended conduit 93 projecting therefrom and mounting a bleed valve 94 which dissipates the effect of the pressure generated in cylinder 44 in the same manner and relation to the operation of the device as above described.

The device is also susceptible of other modifications falling within the spirit of the invention.

I claim:

1. In a regulator for a process having a primary and a secondary control element at primary and secondary stages thereof respectively, primary and secondary metering units connected for response to process conditions at said primary and secondary stages respectively, primary and secondary power members controlled by said primary and secondary metering units respectively, means actuated by each power member for operating the correlated control element, and means actuated by said primary power member upon a change in a process condition at said primary stage for applying to said secondary metering unit for a short time and prior to change of said process at said secondary stage a pre-acting operating impulse proportional in amount and direction to said first mentioned change at said primary stage.

2. In a regulator for a process having a primary and a secondary control element at spaced primary and secondary process zones respectively, primary and secondary metering units connected for response to process conditions at said primary and secondary zones respectively, a pair of power members each controlled by a metering unit, means actuated by each power member for operating the control element to which its metering unit responds, and means actuated by said primary power member in response to a process variation at said primary zone and simultaneously with actuation of its correlated operating means for temporarily applying to said secondary metering unit a measured actuating impulse prior to variation of said process at said secondary zone.

3. The combination with a process having spaced control elements at different process stages, of a plurality of controllers each responsive to the process condition at a selected stage for regulating the control element at said process stage, each controller including a metering unit, a power member controlled by said metering unit, and a control-element-operating member actuated by said power member; and means actuated by the power member of a master controller simultaneously with actuation of its correlated operating member for temporarily impressing upon the metering unit of a secondary controller a measured actuating impulse prior to response of said secondary metering unit to variation of the process stage correlated thereto.

4. The combination with a process having spaced control elements at sequential process stages, of a plurality of controllers each regulating a control element in response to pressure in the correlated stage of the process, said controllers each including a pressure responsive element, a power member controlled by said pressure responsive element, and an actuator for said control element operated by said power member; and pressure generating means actuated by the power member of a primary controller simultaneously with operation of its actuator and connected with and applying a pre-acting impulse to the pressure responsive element of a sequential controller, said last named means having a restricted opening for bleeding off said pre-acting impulse in time with the time required for a change responsive to actuation of said primary control element to occur in the stage of the process correlated with said sequential controller.

5. A regulator comprising primary and secondary pressure sensitive devices connected at primary and secondary stages of a process, a pair of power members each controlling the pressure on one of said pressure sensitive devices, means actuated by each pressure sensitive device for controlling a source of power to operate the power member associated therewith, a pressure generator actuated by each power member and connected with the associated pressure sensitive device for neutralizing the latter, means for dissipating the pressure effect of each pressure generator in timed relation with the response of the pressure sensitive device to the operation of the power member, and a pre-acting pressure generator actuated by the primary power member and connected with the pressure sensitive device and pressure dissipating means associated with the secondary power member to temporarily apply a pre-acting impulse to operate said secondary power member in proportion to the operation of said primary power member and prior to process variation at said secondary stage.

6. A regulator for a process having primary and sequential control elements at primary and sequential process stages, comprising a plurality of pressure sensitive devices connected with said process at different stages, a power member regulating each control element, means actuated by each pressure sensitive device for controlling a source of power to operate the associated power member, a pressure generator actuated by each power member, a pressure system connecting each generator with the associated pressure sensitive device, means in each pressure system for dissipating the pressure from said generator in a predetermined period of time, a pre-acting pressure generator actuated by the power member regulating the primary control element for generating a pressure condition simultaneously with, proportional to and of opposite character to that generated by the first named generator associated with said power member, and means connecting said pre-acting pressure generator with the pressure system associated with a sequential pressure sensitive device to actuate the latter prior to variation of said process at the sequential stage normally controlling said sequential pressure sensitive device.

7. A regulator for a process having spaced stages and sequentially effective control elements at said stages, comprising primary and secondary controllers responsive to process conditions at individual process stages, each controller including a metering device and a power member, and pre-actor means energized by the power member of the primary controller upon variation of said process at the stage to which it responds for generating and transmitting a measured impulse for temporarily actuating the metering device of the secondary controller prior to process variation at the process stage to which said secondary controller responds.

8. A regulator for a process having spaced stages and sequentially effective control elements at said stages, comprising primary and secondary controllers each responsive to process variations at one of said sequential stages and actuating the control element at said stage, each controller including a pressure responsive device and a power member, a fluid pressure generator operated by the power member of said primary controller, means connecting said generator with the pressure responsive device of said secondary controller to impart an actuating impulse thereto prior to actuation of said secondary controller responsive to variation in the stage of the process with which it is associated, and pressure dissipating means in said connecting means.

9. A regulator for a process having spaced primary and secondary stages and sequentially effective control elements at said stages, comprising primary and secondary controllers responsive to process variations at said primary and secondary stages respectively, each controller including a pressure responsive device, a pair of switches selectively operable by said pressure responsive device, an electric motor, and an operating connection between said motor and a control element; and pre-actor means actuated by said primary controller by a condition change at the primary process stage and actuating said secondary controller independently of the condition at the secondary process stage, said pre-actor means comprising a pressure generator actuated by said primary motor, a connector between said generator and said secondary metering device, and pressure dissipating means in said connector for return of said secondary controller to response to the secondary process stage substantially in time with variation at said secondary process stage resulting from actuation of said primary controller.

10. A regulator for a process having spaced primary and secondary stages and sequentially effective control elements at said stages, comprising primary and secondary controllers each including a metering element connected with said process at the process stage with which its controller is associated and a power member connected with the associated control element; means for stabilizing each controller including an impulse generator actuated by the associated power member, an impulse transmitter between each generator and its correlated metering element, and means for limiting the time each impulse is effective on the correlated metering element; and pre-actor means including a pre-acting impulse generator actuated by the power member of the primary controller and connected with the impulse transmitter associated with the metering element of the secondary controller to temporarily actuate the secondary controller prior to operation thereof responsive to process variations at said secondary stage resulting from actuation of said primary controller.

11. A regulator as defined in claim 10, wherein each metering element is sensitive to fluid pressure variations, and said impulse generators create fluid pressure.

12. A regulator for a process having spaced primary and secondary stages and sequentially effective control elements at said stages, comprising primary and secondary controllers each including a pressure responsive device connected with said process at the corresponding stage thereof and a power member connected with the correlated control element; means for stabilizing each controller including a pneumatic pressure generator actuated by the associated power member and connected with the associated pressure responsive device, and an adjustable pneumatic control valve; and pre-actor means including a pre-acting pneumatic pressure generator actuated by the power member of said primary controller and connected with the pressure responsive device and valve of said secondary controller to actuate said secondary controller prior to normal actuation thereof reseponsive to variation of said process at said secondary stage.

13. A regulator for a process having a plurality of spaced stages and sequentially effective control elements at said stages, comprising a controller for each control element responsive to the process condition at the stage at which said control element is located, each controller including a motor and motor actuated means for creating and applying to said controller a stabilizing fluid pressure for a predetermined period of time incident to each operation of said controller, and means actuated by the motor of the initially effective controller for creating and applying to a sequential controller a controller-actuating fluid pressure for a predetermined period of time prior to normal operation of said secondary controller responsive to process variation at the process stage with which said secondary controller is correlated.

14. A regulator for a process having a plurality of spaced stages and initially and sequentially effective control elements at said stages, comprising primary and secondary controllers for said respective control elements and responsive to process conditions at the stages at which said control elements are located, each controller including a motor and motor actuated means for creating and applying to its controller a stabilizing fluid pressure for a predetermined period of time upon each operation of its controller, and means actuated by the motor of said primary controller for creating and applying to said secondary controller a controller-actuating fluid pressure for a predetermined period of time upon each operation of said primary controller, said last named means operating simultaneously with and proportionally to the means for stabilizing said primary controller to actuate said secondary controller in advance of response thereof to its associated process stage.

15. A regulator for a process having spaced sequentially effective control elements at primary and sequential process stages, comprising primary and secondary controllers for said respective control elements and responsive normally to process conditions at the respective stages of said process at which the control elements controlled thereby are located, each controller including a motor and stabilizing means energized for a predetermined time upon each operation of said motor, and means actuated by the motor of the primary controller for applying an impulse to the stabilizing means of the secondary controller for a predetermined period of time prior to normal operation of said secondary controller in response to process variation at the sequential process stage, said stabilizing and impulse-applying means each including a stationary cylinder open at one end and a piston shiftable in said cylinder by the actuating motor therefor.

16. A regulator for a process having spaced sequentially located stages and a control element at each stage, a primary controller responsive to process conditions at the initial process stage and controlling the element at said stage, a secondary controller responsive to process conditions at a sequential process stage and controlling the element at said sequential stage, each controller including a motor and motor actuated means for creating and applying to its controller a stabilizing fluid pressure for a limited time upon each operation of its controller, and means operated by the motor of the primary controller for creating and applying to said secondary controller prior to process variation at said sequential stage a fluid pressure for operating said secondary controller for a limited period of time, the stabilizing means of the primary controller and last named pressure applying means each including a stationary cylinder open at one end, a piston in said cylinder and means connecting said piston with the motor of the primary controller, said respective piston connecting means being connected to the piston in opposed relation.

FRANK DONALD BURNS.